United States Patent [19]

Schlichte

[11] 4,186,276
[45] Jan. 29, 1980

[54] PCM TDM SWITCHING NETWORK

[75] Inventor: Max Schlichte, Munich, Fed. Rep. of Germany

[73] Assignee: Siemens Aktiengesellschaft, Berlin & Munich, Fed. Rep. of Germany

[21] Appl. No.: 884,582

[22] Filed: Mar. 8, 1978

[30] Foreign Application Priority Data

Mar. 28, 1977 [DE] Fed. Rep. of Germany ....... 2713610

[51] Int. Cl.² .............................................. H04J 3/00
[52] U.S. Cl. ............................ 179/15 AT; 179/15 AQ
[58] Field of Search ....................... 179/15 AQ, 15 AT

[56] References Cited

U.S. PATENT DOCUMENTS 3,890,469  6/1975  Kelly et al. ...................... 179/15 AQ

FOREIGN PATENT DOCUMENTS 2444854  4/1976  Fed. Rep. of Germany ..... 179/15 AT

*Primary Examiner*—Bernard Konick
*Assistant Examiner*—Joseph A. Popek
*Attorney, Agent, or Firm*—Hill, Van Santen, Steadman, Chiara & Simpson

[57] ABSTRACT

A PCM TDM switching network has a time-space-time structure composed of switch-through units which, being interlaced and released on a time basis, each operate a plurality of TDM transmission lines and TDM intermediate lines which connect the switch-through units to one another. The units effect both the time-wise and spatial assignment of time channels seized on incoming TDM lines to time channels seized on outgoing TDM lines by means of time slot conversion. The TDM transmission and the TDM intermediate lines are, in each case, connected as groups, by way of separate concentrator and distributor circuits and super-multiplex lines connected thereto which carry the interlaced items of information to the transmission memory of the relevant switch-through unit. The concentrator and distributor circuits which are assigned to the TDM transmission lines comprise cyclically operated multiplexers and demultiplexers, whereas the concentrator and distributor circuits assigned to the TDM intermediate lines are operated acyclically and their interlacing and release arrangement is modified only in the event of changes to the switching network.

2 Claims, 5 Drawing Figures

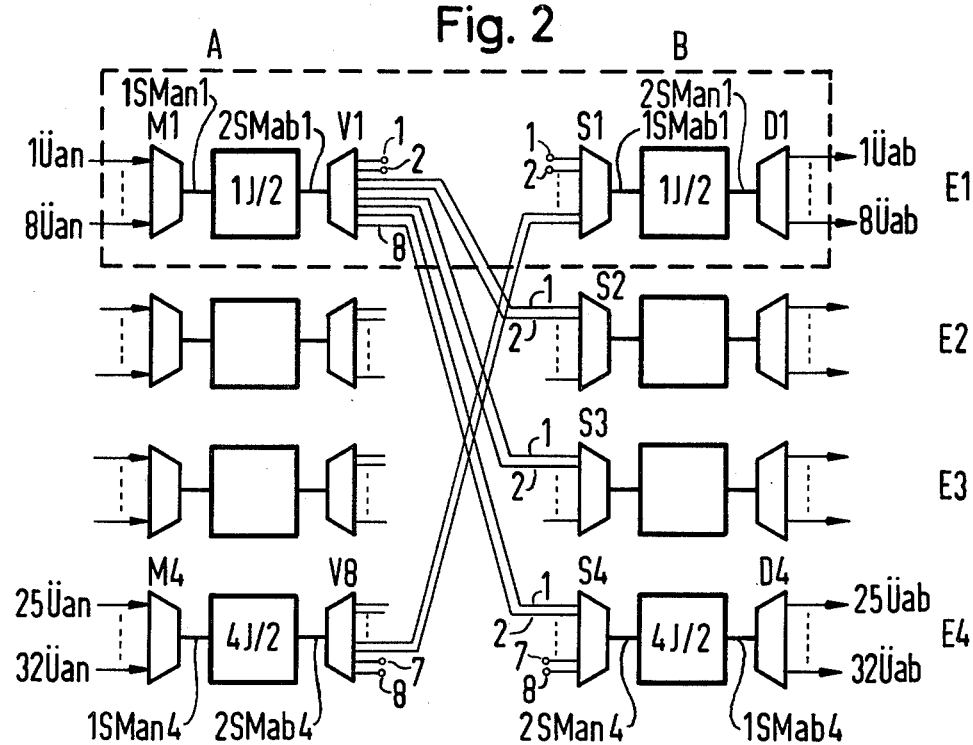
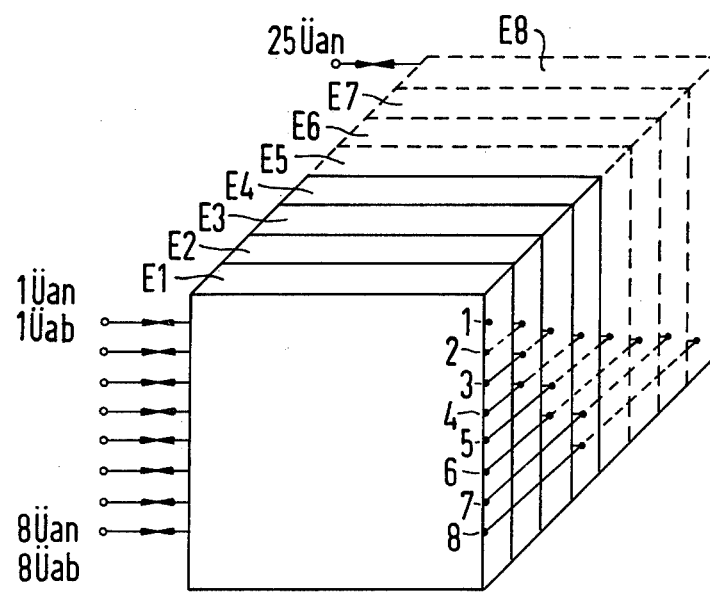

|    | A1 | A2 | A3 | A4 | A5 | A6 | A7 | A8 |
|----|----|----|----|----|----|----|----|----|
| B1 |    | 2  | 3  | 4  | 5  | 6  | 7  | 8  |
| B2 | 2  |    | 4  | 5  | 6  | 7  | 8  | 1  |
| B3 | 3  | 4  |    | 6  | 7  | 8  | 1  | 2  |
| B4 | 4  | 5  | 6  |    | 8  | 1  | 2  | 3  |
| B5 | 5  | 6  | 7  | 8  |    | 2  | 3  | 4  |
| B6 | 6  | 7  | 8  | 1  | 2  |    | 4  | 5  |
| B7 | 7  | 8  | 1  | 2  | 3  | 4  |    | 6  |
| B8 | 8  | 1  | 2  | 3  | 4  | 5  | 6  |    |

PCM TDM SWITCHING NETWORK

BACKGROUND OF THE INVENTION

1. Field of the Invention

The present invention relates to a pulse code modulation (PCM) time division multiplex (TDM) switching network in time-space-time structure comprising switch-through units which, being internested and released on a time basis, each operate a plurality of TDM transmission lines and TDM intermediate lines which connect the switch-through units to one another, and more particularly to such apparatus in which the switch-through units effect the time-wise and spatial allocation of time channels seized on incoming TDM lines to time channels seized on outgoing TDM lines by means of time slot conversion.

2. Description of the Prior Art

In a switching network of this type which is well known in the art, for example one may refer to the German published application No. 24 44 854, the aforementioned switch-through units form at least one two-stage operating network. An operating network of this kind can be arbitrarily extended by adding further switch-through units. In such a case, however, it is necessary to reclassify the TDM lines which connect the switch-through units of the first stage to the switch-through units of the second stage. Reclassification of this type can be avoided if the second stage of the operating network initially contains a number of switch-through units corresponding to the desired completed system. An extension can then be simply achieved by adding further switch-through units in the first stage without the necessity of reclassifying the TDM intermediate lines. However, as stated above, specific provisions must then be provided in the basis construction of the circuits. Furthermore, reclassification cannot be avoided when an extension is effected by adding further of the aforementioned operating networks. The TDM intermediate lines which, for example, establish connections between the particular second stages of two fully-developed operating networks must then, in fact, be used in part to establish connections to the added operating networks.

SUMMARY OF THE INVENTION

Therefore, the object of the present invention is to provide a PCM TDM switching network which is more favorable with respect to extension facilities.

According to the invention, the aforementioned object is realized in a TDM switching network of the type generally mentioned above, in that the TDM transmission lines and the TDM intermediate lines are each connected, as groups, via separate concentrator and distributor circuits and super-multiplex lines connected thereto which carry the internested information, to the information memory of the relevant switch-through unit, and that the concentrator and distributor circuits which are assigned to the TDM transmission lines comprise cyclically operated multiplexers and demultiplexers, whereas the concentrator and distributor circuits which are assigned to the TDM intermediate lines are operated acyclically, although their internesting and release arrangement is modified only in the case of changes in the switching network.

On the basis of the concept of the present invention, in the event that the switching network is extended by further switch-through units to which further TDM transmission lines and TDM intermediate lines are connected, it is no longer necessary to cut off existing intermediate line connections and extend these to different inputs, but in fact it is only necessary to modify the entries in the holding memories which serve to drive the acyclically operated concentrator and distributor provided in accordance with the present invention.

According to a further feature of the invention, the distribution of the time slots formed on the super-multiplex lines between groups of time slots which are assigned to the individual inputs and outputs of the relevant, acyclically operated concentrator and distributor circuits, is rendered dependent upon the traffic conditions. By this means, it is possible to largely avoid time channel blockages when the switching network is subject to heavy load.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a schematic system diagram of a TDM switching network constructed in accordance with the invention and comprising eight switch-through units of the type illustrated in FIG. 1;

FIG. 3 illustrates the switching network of the present invention, as shown in FIG. 2, in a different mode of representation;

DESCRIPTION OF THE PREFERRED EMBODIMENTS

Figure 1:
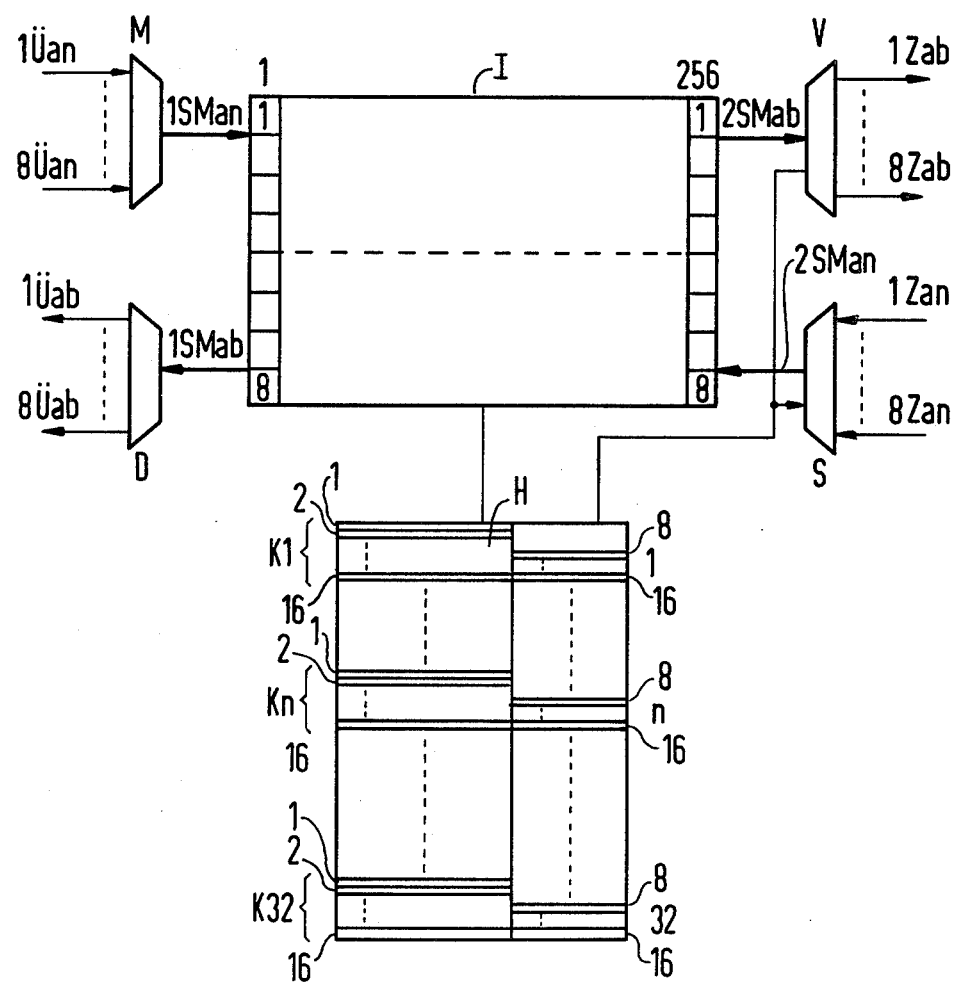
FIG. 1 illustrates a switch-through unit as may be employed in the TDM switching network of the present invention.

The switch-through unit illustrated in FIG. 1 serves to connect eight TDM transmission lines and eight TDM intermediate lines. Both types of lines are four-wire lines. The incoming pairs of the line wires 1Uan–8Uan of the TDM transmission lines are connected to a concentrator circuit in the form of a multiplexer M which is connected by way of a super-multiplex line 1SMan to the information memory I of the switch-through unit.

The outgoing pairs of line wires 1Uab–8Uab of the TDM transmission lines are connected to the outputs of a distributor circuit in the form of demultiplexer D. The input of the demultiplexer is connected to the information memory I by way of the super-multiplex line 1SMab.

The multiplexer M and the demultiplexer D are operated cyclically.

The TDM transmission lines can comprise TDM basic lines which handle only one TDM system, but these lines can also, in fact, represent a super-multiplex line upon which a plurality of TDM systems are linked. If the TDM transmission lines are TDM basic lines, on the super-multiplex lines 1SMan and 1SMab there are, in each case, formed 256 time slots, each of which is assigned to a specific member of the time channels formed on the TDM transmission lines.

The incoming pairs of line wires of TDM intermediate lines 1Zan–8Zan are connected to a concentrator circuit S which is connected by way of the super-multiplex line 2SMan to the information memory I of the switch-through unit. Correspondingly, a distributor circuit V is connected by way of the super-multiplex line 2SMab to the information memory I. The outgoing pairs of line wires 1Zab–8Zab of the TDM intermediate lines are connected to the outputs of this distributor circuit. Each of the super-multiplex lines 2SMan and 2SMab carry 256 time slots. The time slots are formed in eight groups of time slots, each of which is assigned to a different outgoing pair of line wires 1Zab–8Zab and incoming pair of line wires 1Zan–8Zan of the TDM intermediate lines. It is not absolutely required that the size of the time slot groups be the same, and in fact the groups can be matched to the traffic to be handled by way of the individual TDM intermediate lines. In the present example, the groups of time slots will be assumed to be of equal size.

The concentrator circuit S and the distributor circuit V are operated by a holding memory H of the switch-through unit in such a manner that, during the time slot groups formed on the super-multiplex lines 2SMan and 2SMab, connections are in each case established to a different member of the TDM intermediate lines. The assignment of the eight time slot groups within the 256 time slots of a pulse frame to TDM intermediate lines remains unchanged for one and the same switch-through unit for such time as there is no alteration in the construction of the TDM switching network to which the switch-through unit belongs. However, as will be explained below, the assignment differs from switch-through unit to switch-through unit.

Multiplexer M and the concentrator circuit S each contain a series-parallel converter, and the demultiplexer D and the distributor circuit V are linked to a parallel-series converter. The series-parallel converters serve to convert the eight bits of the PCM words into parallel form. By the same token, the reconversion effected by the parallel-series converters is from parallel to serial form. The aforementioned super-multiplex lines are thus eight-wire lines. The information memory I of the switch-through unit illustrated in FIG. 1 has 256 storage rows each for eight bits, under the condition that the operation is such that only one storage position is required for items of information of both transmission directions of one and the same connection. In fact, a maximum of 256 connections can exist simultaneously between all the sixteen connected TDM lines each comprising 32 time channels.

The aforementioned double exploitation of a storage row of this information memory for both transmission directions requires a double operation of a storage row of the kind in question within a pulse frame.

Therefore, the holding memory which is employed to operate the information memory I must have twice the number of storage positions for drive addresses, thus 512 storage rows. These storage positions, which are contained in a first part of the holding memory H (shown in the left-hand side of FIG. 1) form, in accordance with the 32 time channels of the assumed PCM system, 32 groups, each comprising 16 storage rows, each of which storage rows is assigned to a different TDM line, for example the first eight being assigned to the eight TDM transmission lines and the second eight being assigned to the TDM intermediate lines. The drive addresses for the storage rows of the information memory I are entered in these storage rows in accordance with the current exchange program.

A second part of the holding memory H (shown on the left-hand side of FIG. 1) has 256 storage positions which likewise form groups which assigned to the 32 time channels and which, in this case, comprise only eight storage positions. The storage positions of this second part are, in cyclic read-out of the holding memory, operated together with the corresponding storage positions of the second half of the groups of the storage positions in the first part of this holding memory. They contain the addresses for the common drive of the inputs of the concentrator circuit S and the outputs of the distributor circuit V. The entries in this second part of the holding memory differ from switch-through unit to switch-through unit and correspond to the relevant intermediate line wiring which serves to connect the distributor circuit outputs and the concentrator circuit inputs of various switch-through units to one another. The entries are retained for such time as no alteration is made in this intermediate line wiring.

FIG. 2 illustrates a TDM switching network composed of four switch-through units of the type illustrated in FIG. 1. Here, the so-called elongated mode of representation has been used. This means that the transmission direction always runs from left to right. Accordingly, on the left-hand side, the incoming pairs of line wires Uan are connected to the inputs of the multiplexers M1–M4, and on the right-hand side the outgoing pairs of line wires Uab of the TDM transmission lines are connected to the outputs of the demultiplexers D1–D4.

Those components which, in this mode of representation, are assigned to the first switch-through unit E1, are framed in broken lines in FIG. 2.

It can be seen from FIG. 2 that the information memory of a switch-through unit is represented twice, namely on the one hand by way of the super-multiplex line 1SMan and 2SMab between the multiplexer M and the distributor circuit V, and on the other hand via the super-multiplex line 2SMan and 1SMab between the concentrator circuit S and the demultiplexer D. However, this mode of representation does not mean that this division is technologically present, and, in particular, does not mean that the information memory has twice the storage capacity of that illustrated in FIG. 1, as indicated by the selected indexing 1I/2–4I/2.

The distributor circuits V1–V4 and the concentrator circuits S1–S4 each have eight outputs and inputs. From the outputs of the distributor circuits V1–V4, two intermediate line links in each case lead to each concentrator circuit S1–S4 of the other switch-through units. As no intermediate line link is required between the distributor circuit V and the concentrator circuit S of one and the same switch-through unit, as in fact illustrated in FIG. 2, two outputs and inputs remain free in each of these circuits.

The entry of drive addresses for the concentrator circuits and the distributor circuits, explained with reference to FIG. 1, is such, for example, in each case of the distributor circuit V1, that during a third and fourth group of the 256 time slots formed in respect of each pulse frame on the super-multiplex line 2SMab1, the outputs 3 and 4, etc, are activated, whereas during a seventh and eighth group of time slots the outputs 7 and 8 are activated.

In the case of the concentrator circuit S2, it must then be ensured that during the aforementioned third and fourth groups of time slots, in which the third and fourth output of the distributor circuit V1 are activated, the inputs 1 and 2 are also activated. Accordingly, in the concentrator circuit S4, the address entry in the holding memory must be such that the inputs 1 and 2 are activated during the time slot groups 7 and 8.

In FIG. 3, the TDM switching network which comprises four switch-through units E1–E4, as illustrated in FIG. 2, is represented in solid lines in a different, schematic mode of representation. Here, each of the switch-through units is represented by one of the levels to which the TDM transmission lines are connected on the left-hand side, and the TDM intermediate lines are connected on the right-hand side. The individual pairs of line wires of the TDM lines are no longer shown separately, but double arrows indicate that these are four-wire lines.

Here, again, the intermediate line wiring between the individual switch-through units can be seen, although only the wiring of the switch-through unit E1 to the other switch-through units is represented. Accordingly, two intermediate line links exist from the switch-through unit E1 to all the other switch-through units E2–E4. Two outputs/inputs of the switch-through unit E1 remain free. Corresponding links exist between all the other of the switch-through units E2–E4 and the other switch-through units (not illustrated).

It will now be assumed that the TDM switching network illustrated in FIG. 3 is to be extended by four further switching units, as indicated by broken lines in FIG. 3.

As the number of the inputs/outputs of the switch-through units is fixed, and here is, in each case, eight, and an intermediate line link is to exist between each switch-through unit to each other switch-through unit, only one intermediate link can now be arranged between two switch-through units.

In conventional switching networks, in which the circuit components corresponding to the distributor circuit and the concentrator circuit of the switch-through unit constructed in accordance with the invention operates cyclically, in the event of an extension of this kind it will be necessary, on the one hand, to cut off the double intermediate line links and, on the other hand, in order to maintain a specific systematology, it would be necessary to reclassify the remaining intermediate line links to other inputs of the other switch-through units.

According to the present invention, however, this reclassification is not necessary. Existing intermediate line links can be maintained, and only continued to other switch-through units. Thus, as illustrated by the broken intermediate line links in FIG. 3, for example, one of the intermediate links which originally connected the switch-through unit E1 to the switch-through unit E4, now constitutes part of the intermediate line which connects the switch-through unit E1 to the added switch-through unit E8. The other of these two intermediate links now forms part of the intermediate line running between the switch-through units E1 and E7. The same applies to the other original intermediate lines. One of the originally free inputs/outputs of the switch-through unit E1 is now connected to the intermediate lines which establish a connection, for both directions of transmission, with the switch-through unit E2.

As represented in respect of the switch-through unit E1, one input/output remains free in order that, as will be explained below, the TDM switching network illustrated in FIG. 3 can be extended by a further number of terminals for TDM transmission lines.

As a result of appropriate modifications of the drive address entries for the distributor circuits V and the concentrator circuits S of the individual switch-through units in the corresponding holding memory positions, on the one hand it is ensured that existing intermediate line links, such as for example the link between the eight inputs/outputs of the switch-through units E1 and E4 are no longer used for information transmission between these two switch-through units, and, on the other hand, that the desired, above-described, new classification is maintained.

Figures 4, 5:
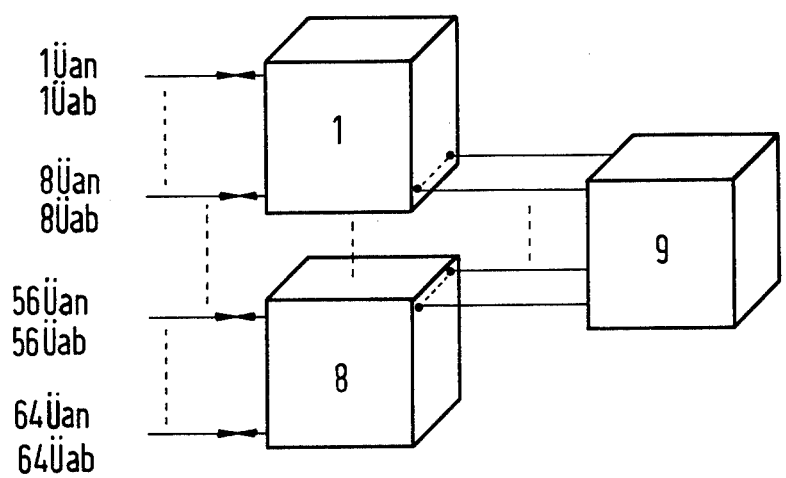
FIG. 4 is a tabular illustration of a time slot distribution plan for the TDM switching network of FIG. 2.
FIG. 5 is a schematic block diagram which illustrates the TDM switching network of FIG. 3 in a form which has been extended to provide eight times the connection capacity.

By way of example, FIG. 4 illustrates a corresponding assignment plan for the extended TDM switching network shown in FIG. 3, which indicates the assignment of time slot groups on the super-multiplex lines connected to the distributor and concentrator circuits, to the corresponding outputs and inputs.

As can be best seen from FIG. 2, the TDM switching networks illustrated in FIG. 2 and FIG. 3 comprise two stages. Therefore, the switch-through units in each case both form a part of an A-stage of the switching network and a part of the B-stage thereof. Accordingly, the switch-through units in the distribution plan illustrated in FIG. 4, on the one hand, with A1–A8, form a part of the A-stage, and with B1–B8, form a part of the B-stage.

The time slot group in each case used for the relevant link between two switch-through units is entered at the intersection points of an A column and a B row of the schedule illustrated in FIG. 4. Therefore, for example, a connection is established between the switch-through unit E1 as a part of the A-stage and the switch-through unit E2 as a part of the B-stage employing the second time slot group within the time slots formed on the super-multiplex lines of the relevant switch-through units. In this connection, one may refer to the intersection point of the column A1 and the row B2. This also applies to the opposite direction of transmission, namely the link between the switch-through unit E2 as part of the A-stage and the switch-through unit E1 as part of the B-stage. In this connection see the intersection point of the column A2 and the row B1.

Since, as already mentioned, the spatial component of the switching network is not employed for a connection of TDM transmission lines which are connected to one and the same switch-through unit, for which reason a corresponding intermediate line link is not provided, in FIG. 4 no entries have been made at the intersection points between columns and rows bearing the same reference. In this connection, one may refer to the free inputs/outputs in FIG. 2.

It can also be seen from FIG. 4 that in none of the columns and rows does a time slot group occur twice, which is in conformity with the explanations relating to FIG. 3, and in accordance with which, in spite of multiple intermediate line links between two specific switch-through units, only one of these intermediate line links is active. Therefore, for example, when the switching network has been extended to eight switch-through units, three intermediate line links exist between the switch-through units E1 and E4, namely between the fourth, seventh and eighth inputs/outputs. However, in accordance with the distribution plan in FIG. 4, only the intermediate line link between the fourth inputs- /outputs is active. The fourth time slot group is employed for this purpose.

As previously mentioned, by means of groups of further switch-through units, the TDM switching network for example is illustrated in FIG. 3, can be extended by connection of groups of further TDM transmission lines. FIG. 5 illustrates an example of such an extension, in which the TDM switching network as shown in FIG. 3, which serves to connect $8 \times 8$ TDM transmission lines, has been extended to provide total connection facilities of $8 \times 8 \times 8$ TDM transmission lines by the addition of seven further groups of switch-through units to which further TDM transmission lines are connected, and one further group of switch-through units to which only TDM intermediate lines are connected.

The size of the group of switch-through units to which only TDM intermediate lines are connected, is dependent upon the traffic requirements, and this group does not absolutely require a composition of eight switch-through units. Naturally, an extension of this type can also be carried out in smaller steps.

In the event of an even more extensive development, the configuration illustrated in FIG. 5 is provided in multiple, and the individual switching network components are connected to one another by a further group of switch-through units to which only TDM intermediate lines are connected.

Although I have described my invention by reference to particular illustrative embodiments thereof, many changes and modifications of the invention may become apparent to those skilled in the art without departing from the spirit and scope thereof. I therefore intend to include within the scope of the patent warranted hereon all such changes and modifications as may reasonably and properly be included within the scope of my contribution to the art.

I claim:

1. A pulse code modulation, time division multiplex switching network, in a time-spaced-time structure, comprising:
    a plurality of time division multiplex transmission lines and intermediate time division multiplex transmission lines;
    a plurality of switch-through units interconnected by said transmission lines and operable to provide both time and spatial assignment of time channels seized on incoming transmission lines to time channels seized on outgoing transmission lines by time slot conversion; and
    a plurality of concentrator circuits and a plurality of distributor circuits connecting said time division multiplex transmission lines and said intermediate lines in groups;
    said concentrator and distributor circuits assigned to said transmission lines respectively comprising cyclically operated multiplexers and demultiplexers, and
    said concentrator and distributor circuits assigned to said intermediate transmission lines respectively comprising acyclically operated multiplexers and demultiplexers, including respective interlacing and release arrangements which are modified only in the event of changes to the switching network resulting from the expansion of an existing switching network through the addition of additional switch-through units and the connection of additional time multiplex lines.

2. The pulse code modulation, time division multiplex switching system of claim 1, comprising:
    super-multiplex lines interconnecting said concentrator and distributor circuits with a distribution of super-multiplex time slots between groups of time slots assigned to the individual inputs and outputs of the relevant concentrator and distributor circuits being dependent upon the traffic conditions of the system.

* * * * *